United States Patent [19]
Koizumi

[11] Patent Number: 5,646,977
[45] Date of Patent: Jul. 8, 1997

[54] MOBILE TELEPHONE DEVICE SYSTEM HAVING STEAL PREVENTION FUNCTION

[75] Inventor: Fumiaki Koizumi, Tokyo, Japan

[73] Assignee: NEC Corporation, Tokyo, Japan

[21] Appl. No.: 563,943

[22] Filed: Nov. 29, 1995

[30] Foreign Application Priority Data

Nov. 29, 1994 [JP] Japan ................................ 6-295003

[51] Int. Cl.$^6$ .............................. H04Q 7/20; H04Q 7/32
[52] U.S. Cl. ...................... 455/411; 455/565; 455/566; 455/572
[58] Field of Search ............................. 379/58, 59, 60, 379/62; 455/33.1, 33.2; 364/449

[56] References Cited

FOREIGN PATENT DOCUMENTS 63-65250  12/1988  Japan .

*Primary Examiner*—William Cumming
*Attorney, Agent, or Firm*—Scully, Scott, Murphy & Presser

[57] ABSTRACT

In a mobile telephone device having a preassigned call number and comprising a power supply unit, a keyboard section, a display section, a power key, and a control section, the mobile telephone device transmits, on position registration operation, a position registration signal including the preassigned call number to the base station and receives an information signal from the base station as a result of the position registration operation. The information signal is for representing whether or not the preassigned call number coincides with that of a stolen mobile telephone device. The control section invalidates the operation of the keyboard and the power key and stops display of the display section and then transmitting an alarm signal to the base station on reception of the information signal representing the fact that the preassigned call number coincides with that of the stolen mobile telephone device.

8 Claims, 3 Drawing Sheets

MOBILE TELEPHONE DEVICE SYSTEM HAVING STEAL PREVENTION FUNCTION

BACKGROUND OF THE INVENTION

This invention relates to a mobile telephone device having steal prevention function. Such a mobile telephone device is particularly useful in a portable radio telephone device.

An example of the mobile telephone device is disclosed in Japanese Patent Publication No. Tokkosho 63-65250 (65250/1988). The mobile telephone device is used in a steal prevention system. The steal prevention system is for the mobile telephone device which is used on an automobile and aims to carry out a follow-up survey when the automobile having the mobile telephone device was stolen. Namely, the steal prevention system is for establishing the follow-up survey of a stolen automobile even if the mobile telephone device loaded on the stolen automobile is not used. The steal prevention system is based on the fact that the mobile telephone device has a preassigned call number. In the following description, the mobile telephone device loaded on the stolen automobile is called a stolen mobile telephone device.

In order to establish the above-mentioned purpose, the steal prevention system comprises a base station for connecting the mobile telephone device to a telephone network. The steal prevention system is on the premise that a call number of the stolen mobile telephone device is registered, as a stolen call number, in the base station. For the reason, the base station comprises a memory unit memorizing the stolen call number. The base station transmits an information signal including the stolen call number.

On the other hand, the mobile telephone device receives the information signal even if the mobile telephone device is not used, namely, even if a power switch is put into an off state. The mobile telephone device comprises a power supply unit which is removably attached to a body of the mobile telephone device and a decision section for carrying out a decision operation whether or not the preassigned call number coincides with the stolen call number included in the information signal. When the decision section decides that the preassigned call number coincides with the stolen call number, a transmitting section is activated and transmits an alarm signal representative of a fact that the preassigned call number coincides with the stolen call number.

When the alarm signal is received by the base station, the alarm signal is displayed by a display unit in the base station. Then, the base station carries out the follow-up survey of the stolen automobile by the use of the alarm signal.

As mentioned above, since the mobile telephone device always monitors the information signal, the mobile telephone device has an increased power consumption. This means that the increased power consumption hastens voltage drop of the power supply unit.

Furthermore, if the power supply unit is removed from the body of the mobile telephone device, it is impossible to monitor the information signal and to transmit the alarm signal. This means that it is impossible to establish the above-mentioned purpose. The above-mentioned operation is applied to the mobile telephone device which is not loaded on the automobile.

SUMMARY OF THE INVENTION

It is therefore an object of this invention to provide a mobile telephone device which is capable of improving a battery saving efficiency and which is capable of improving steal prevention function.

It is another object of this invention to provide the mobile telephone device which is capable of establishing a follow-up survey of a stolen mobile telephone device, even if a power supply unit is removed from the stolen mobile telephone device.

It is a further object of this invention to provide a steal prevention system which is suitable for the above-mentioned mobile telephone device.

According to an aspect of this invention, a mobile telephone device has a preassigned call number and comprises a power supply unit for supplying electric power through a power supply line and removably attached to a body of the mobile telephone device. The mobile telephone device further comprises a keyboard section, a display section, a power key for instructing power supply from the power supply unit, and a control section connected to the keyboard section, the display section, and the power key for controlling operation of the keyboard section, the display section, and the power key. The mobile telephone device transmitting, on position registration operation for registering the preassigned call number to the base station, a position registration signal including the preassigned call number to the base station and receiving an information signal from the base station as a result of the position registration operation. The information signal is for representing whether or not the preassigned call number coincides with that of a stolen mobile telephone device. The control section invalidates the operation of the keyboard and the power key and stopping display of the display section and then transmitting an alarm signal to the base station on reception of the information signal representing the fact that the preassigned call number coincides with that of the stolen mobile telephone device.

DESCRIPTION THE PREFERRED EMBODIMENT

Figure 1:
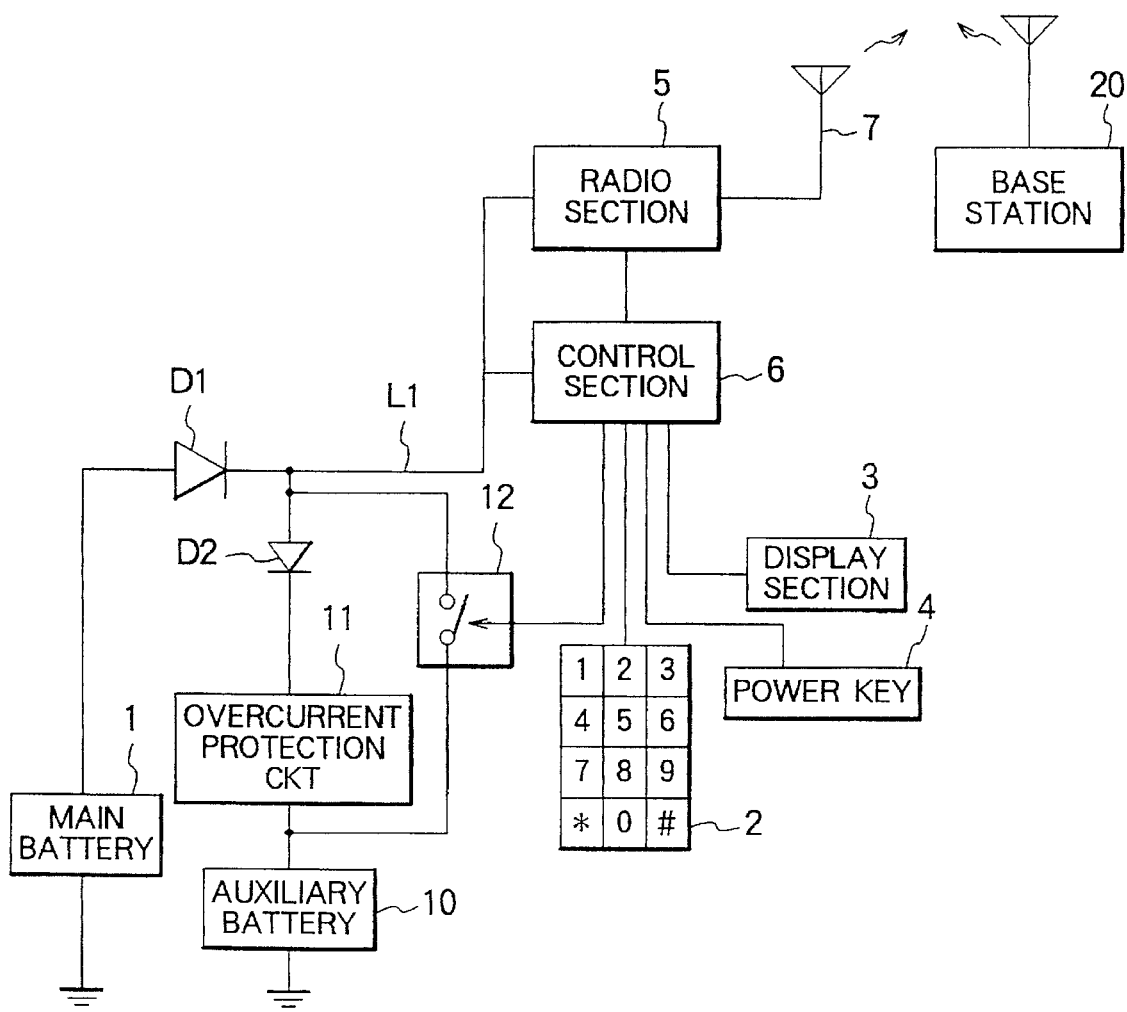
FIG. 1 shows a block diagram of a mobile telephone device according to a preferred embodiment of this invention.

Referring to FIG. 1, description will be made with regard to a mobile telephone device according to a preferred embodiment of this invention. The mobile telephone device has a preassigned call number and comprises a main battery 1, a keyboard section 2, a display section 3, a power key 4, a radio section 5, a control section 6, and an antenna 7.

The main battery 1 is for supplying electric power through a power supply line L1. As well known in the art, the main battery 1 is removable from a body of the mobile telephone device and is chargeable by a battery charger. Such a main battery 1 may be called a power supply unit or an outer battery. The power key 4 is for instructing power supply from the main battery 1. In other words, when the power key 4 is pushed, the power supply is started from the main battery 1. As will later become clear, the radio section 5 is for receiving a radio signal, such as an information signal and a control signal, from a base station 20 and transmitting a transmission signal, such as a position registration signal and an alarm signal, to the base station 20. Although the radio section 5 receives and transmits various other signals in telephone talk, the description for the other signals is omitted. Needless to say, the base station 20 is for connecting the mobile telephone device to a telephone network(not shown). The control section 6 is for carrying out control operation of a reception operation and a transmission operation both of which are required to carry out the telephone talk. Since the control operation for the telephone call is well known in the art, the description of the control operation is omitted. In addition to the above-mentioned control operation, the control section 6 controls operation of the keyboard section 2, the display section 3, and the power key 4 as will later be described.

The mobile telephone device further comprises an auxiliary battery 10, an overcurrent protection circuit 11 connected between the main battery 1 and the auxiliary battery 10, a first diode D1 inserted into the power supply line L1, a second diode D2 connected between the first diode D1 and the overcurrent protection circuit 11, and a switch section 12 connected in parallel to the second diode D2 and the overcurrent protection circuit 11 and to the control section 6.

While the switch section 12 is put into an off state, the auxiliary battery 10 is charged from the main battery 1. Under the circumstances, a supply line connected between the main battery 1 and the auxiliary battery 10 serves as a charging circuit. While a charge operation is carried out, the auxiliary battery 10 is protected by the overcurrent protection circuit 11 from the overcurrent. The first diode D1 is for preventing the current which flows from the auxiliary battery 10 to the main battery 1. The second diode D2 is for preventing the current which flows to the power supply line L1 when the switch section 12 is put into the off state. In other words, the auxiliary battery 10 can supply the electric power through the power supply line L1 only when the switch section 12 is put into an on state. As will later be described, the switch section 12 is put into the on state in first and second cases under control of the control section 6. It should be noted here that the auxiliary battery 10 is included into the body of the mobile telephone device and is therefore hard to remove from the body. Under the circumstances, the auxiliary battery 10 may be called an inner battery.

Although it is not illustrated in FIG. 1, the mobile telephone device further comprises a remaining quantity display unit for displaying remaining quantity of electric power in the main battery 1. A user decides whether or not the remaining quantity of the electric power is sufficient for driving the mobile telephone device by monitoring the remaining quantity display unit. If the user decides that the remaining quantity of the electric power is insufficient, the user puts a predetermined key in the keyboard section 2. When the predetermined key is put, the control section 6 puts the switch section 12 into the on state. As a result, the electric power is supplied from the auxiliary battery 10 through the switch section 12 in addition to the main battery 1. This case is applicable to the first case mentioned before.

Figure 2:
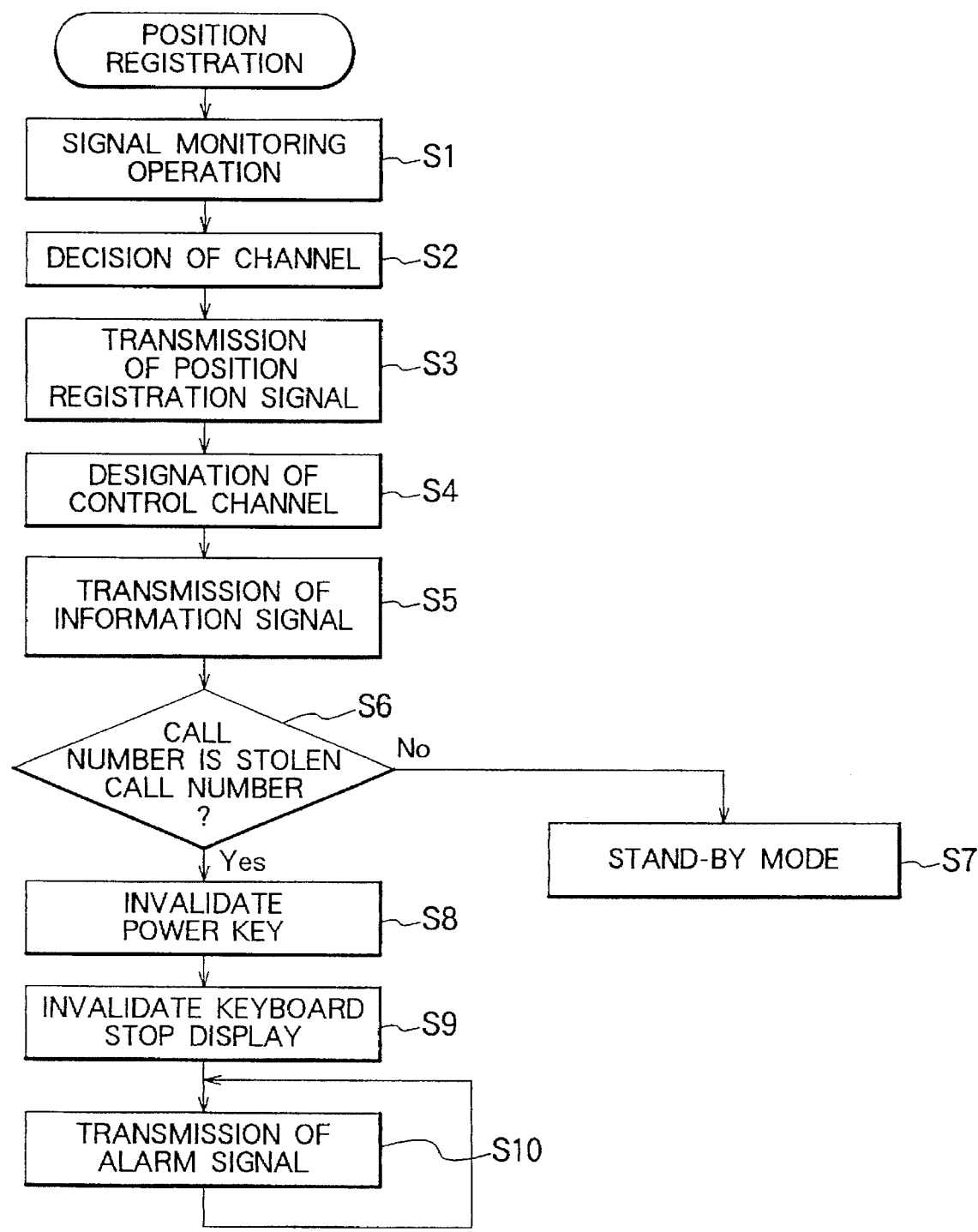
FIG. 2 shows a flow chart for describing steal prevention operation of this invention.
Figure 3:
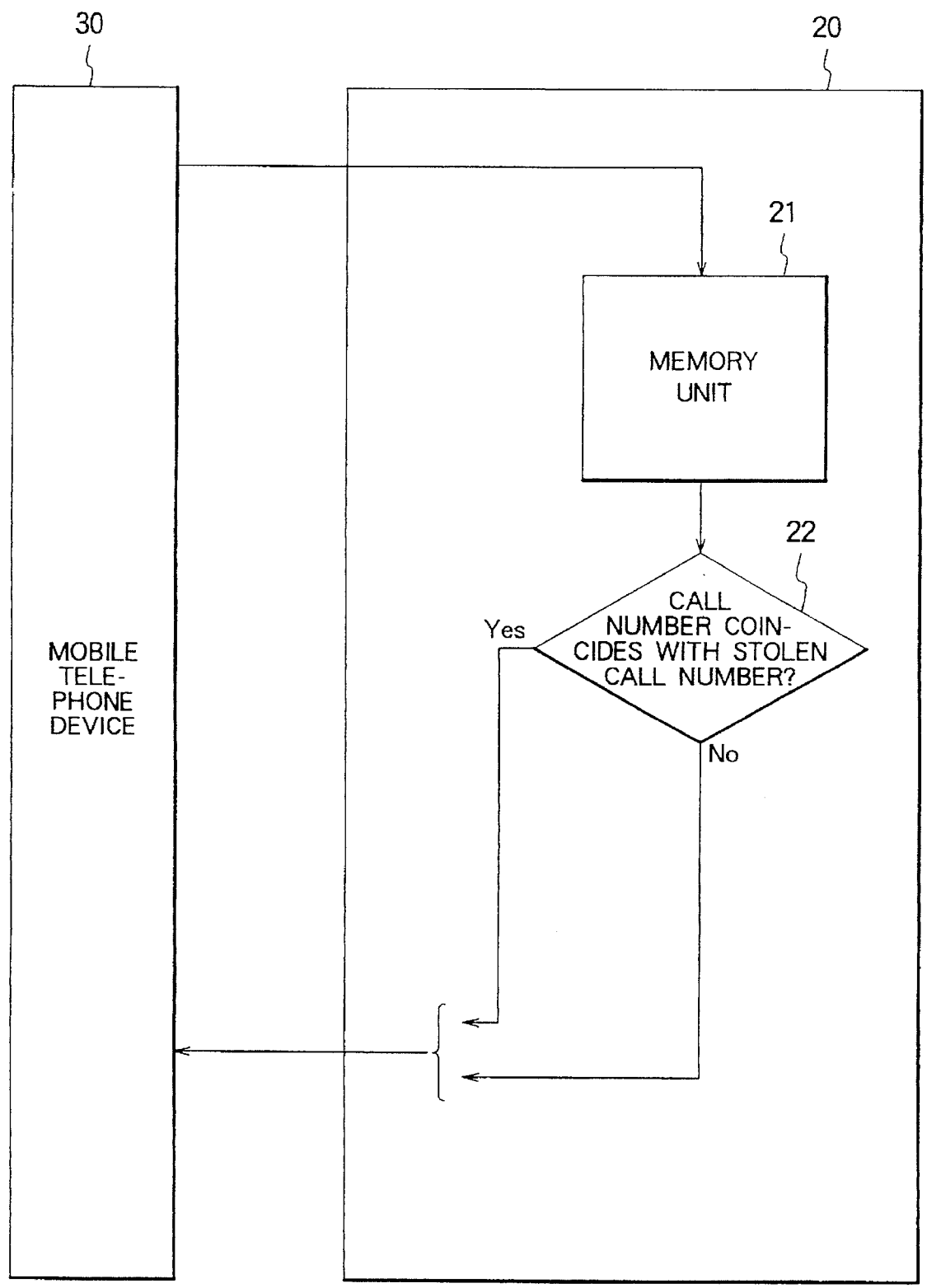
FIG. 3 shows a block diagram for describing a steal prevention system according to a preferred embodiment of this invention.

Referring to FIGS. 2 and 3 together with FIG. 1, the description will be made as regards steal prevention operation for steal prevention of the mobile telephone device. Strictly, the word of "steal prevention" to which the present invention aims means preventing to use a stolen mobile telephone device. If the mobile telephone device is stolen, the user registers the preassigned call number of the stolen mobile telephone device as a stolen call number. In order to realize the steal prevention, the base station 20 comprises a memory unit 21 (FIG. 3) for memorizing the stolen call number as a particular call number. When the stolen call number is registered in the base station 20, it is stored in the memory unit 21 in the base station 20. In FIG. 3, the mobile telephone device illustrated in FIG. 1 is symbolically depicted at 30.

The steal prevention operation is carried out together with position registration operation which is known in the art. The position registration operation is started when the power key 4 is pushed. At a first step S1, the control section 6 starts signal monitoring operation for measuring an electric field level of a reception signal received by the radio section 5. Such a signal monitoring operation is called channel scanning operation. Namely, the signal monitoring operation is carried out in order to search a particular channel which has a highest electric field level.

At a second step S2, the particular channel is decided based on the result of the signal monitoring operation. At third step S3, the position registration signal comprising the preassigned call number is transmitted by the particular channel under control of the control section 6. The position registration signal is received by the base station 20 that has the particular channel. At a fourth step S4, the base station 20 transmits the control signal which designates a control channel required for the telephone talk.

The base station 20 further comprises a decision unit 22 for deciding whether or not the preassigned call number coincides with the stolen call number memorized in the memory unit 21. At a fifth step S5, the base station 20 transmits the information signal which represents whether or not the preassigned call number is that of the stolen mobile telephone device. Namely, if the preassigned call number coincides with the stolen call number, the information signal represents the fact that the preassigned call number coincides with the stolen call number. This means that the mobile telephone device 30 is the stolen mobile telephone device. When the preassigned call number does not coincide with the stolen call number, the information signal represents that the preassigned call number does not coincide with the stolen call number. This means that the mobile telephone device 30 is not the stolen mobile telephone device.

At a sixth step S6, the mobile telephone device 30 receives the information signal. The control section 6 decides whether or not the information signal represents that the preassigned call number coincides with the stolen call number. If the information signal represents that the preassigned call number does not coincide with the stolen call number, the operation proceeds to a seventh step S7. At the seventh step S7, the control section 6 shifts to a stand-by mode. In the stand-by mode, the control section 6 monitors the control channel in order to prepare for calling.

If the information signal represents that the preassigned call number coincides with the stolen call number, the sixth step S6 Is succeeded by an eighth step S8. At the eighth step S8, the control section 6 invalidates operation of the power key 4. In other words, the control section 6 disregards the push operation of the power key 4. Simultaneously, the control section 6 invalidates the operation of the keyboard 2 and stops display of the display section 3 at a ninth step S9. Thus, the mobile telephone device 30 becomes impossible to use.

Furthermore, the control section 6 puts the switch section 12 into the on state when the information signal represents that the preassigned call number coincides with the stolen call number. As a result, the auxiliary battery 10 supplies the electric power through the switch section 12 and the power supply line L1. This case is applicable to the second case mentioned in conjunction with FIG. 1. Then, the control section 6 carries out transmission of the alarm signal which represents that the mobile telephone device 30 is the the stolen mobile telephone device. Moreover, the alarm signal represents that the mobile telephone device 30 was set on an unserviceable state. The base station 20 receives the alarm signal and carries out a follow-up survey by the use of the alarm signal. It should be noted here that the mobile telephone device 30 continues transmission of the alarm signal if the main battery 1 is removed from the body of the mobile telephone device 30. This is because the electric power is supplied from the auxiliary battery 10. This is the reason why the auxiliary battery 10 is included in the body of the mobile telephone device 30.

The above-mentioned operation is applied to a case that the mobile telephone device is used on an automobile. In this case, a battery unit mounted on the automobile may be used in place of the main battery 1.

According to the present invention, it is possible to improve a battery saving efficiency because the mobile telephone device 30 monitors the information signal only when the mobile telephone device 30 carries out the position registration operation.

While this invention has thus far been described in conjunction with a preferred embodiment thereof, it will readily be possible for those skilled in the art to put this invention into practice in various other manners.

What is claimed is:

1. A mobile telephone device having a preassigned call number and comprising:

a power supply unit for supplying electric power through a power supply line and removably attached to a body of said mobile telephone device;

a keyboard section;

a display section;

a power key for instructing power supply from said power supply unit; and a control section connected to said keyboard section, said display section, and said power key for controlling operation of said keyboard section, said display section, and said power key;

said mobile telephone device transmitting, on position registration operation for registering said preassigned call number to said base station, a position registration signal including said preassigned call number to said base station and receiving an information signal from said base station as a result of said position registration operation, said information signal being for representing whether or not said preassigned call number coincides with that of a stolen mobile telephone device;

said control section invalidating the operation of said keyboard and said power key and stopping display of said display section and then transmitting an alarm signal to said base station on reception of said information signal representing the fact that said preassigned call number coincides with that of said stolen mobile telephone device.

2. A mobile telephone device as claimed in claim 1, further comprising:

an auxiliary battery;

a charging circuit connected between said power supply unit and said auxiliary battery for charging said auxiliary battery from said power supply unit; and a switch section connected to said auxiliary battery and said control section for making said auxiliary battery to supply electric power through said power supply line.

3. A mobile telephone device as claimed in claim 2, further comprising:

an overcurrent protection circuit connected between said power supply unit and said auxiliary battery for protecting said auxiliary battery from overcurrent.

4. A mobile telephone device as claimed in claim 2 or 3, wherein said control section puts said switch section into an on state when a predetermined key in said keyboard section is pushed or when it receives said information signal representative of the fact that said preassigned call number coincides with that of said stolen mobile telephone device.

5. A steal prevention system comprising:

a mobile telephone device having a preassigned call number and comprising a power supply unit for supplying electric power through a power supply line and removably attached to a body of said mobile telephone device, a keyboard section, a display section, a power key for instructing power supply from said power supply unit, and a control section connected to said keyboard section, said display section, and said power key for controlling operation of said keyboard section, said display section, and said power key; and a base station for connecting said mobile telephone device to a telephone network;

said mobile telephone device transmitting, on position registration operation for registering said preassigned call number to said base station, a position registration signal including said preassigned call number to said base station;

said base station comprising a memory unit which memorizes a particular call number that is of a stolen mobile telephone device and a decision means supplied with said particular call number and said preassigned call number included in said position registration signal for deciding whether or not said preassigned call number coincides with said particular call number, said base station transmitting, to said mobile telephone device, an information signal representing whether or not said preassigned call number coincides with said particular call number;

said control section invalidating the operation of said keyboard and said power key and stopping display of said display section and then transmits an alarm signal to said base station on reception of said information signal representing the fact that said preassigned call number coincides with said particular call number.

6. A steal prevention system as claimed in claim 5, wherein said mobile telephone device further comprises:

an auxiliary battery;

a charging circuit connected between said power supply unit and said auxiliary battery for charging said auxiliary battery from said power supply unit; and a switch section connected to said auxiliary battery and said control section for making said auxiliary battery to supply electric power through said power supply line.

7. A steal prevention system claimed in claim 6, wherein said mobile telephone device further comprises:

an overcurrent protection circuit connected between said power supply unit and said auxiliary battery for protecting said auxiliary battery from overcurrent.

8. A steal prevention system as claimed in claim 6 or 7, wherein said control section puts said switch section into an on state when a predetermined key in said keyboard section is pushed or it receives said information signal representative of the fact that said preassigned call number coincides with said particular call number.

* * * * *

UNITED STATES PATENT AND TRADEMARK OFFICE
CERTIFICATE OF CORRECTION

PATENT NO. : 5,646,977
DATED : July 8, 1997
INVENTOR(S) : Fumiaki Koizumi

It is certified that error appears in the above-identified patent and that said Letters Patent is hereby corrected as shown below:

Title page, item [56], after "References Cited" insert the following:

-- U.S. PATENT DOCUMENTS

5,335,265    8/1994    Cooper et al..........379/59

5,430,656    7/1995    Dekel et al..........364/449--

Column 4, line 53: "Is" should read --is--

Signed and Sealed this

Eleventh Day of January, 2000

Attest:

Q. TODD DICKINSON

Attesting Officer

Acting Commissioner of Patents and Trademarks